United States Patent [19]

Tsepenuk

[11] Patent Number: 5,655,404
[45] Date of Patent: Aug. 12, 1997

[54] MECHANISM FOR CONVERTING RECIPROCAL MOVEMENT

[76] Inventor: Mikhail Tsepenuk, 29 22 Fort Hamilton Hwy., Brooklyn, N.Y. 11218

[21] Appl. No.: 288,222

[22] Filed: Aug. 9, 1994

[51] Int. Cl.$^6$ .......................... F16H 19/04; F16H 21/22; F16H 29/30
[52] U.S. Cl. .......................... 74/30; 74/32; 74/50; 74/132; 123/197.3
[58] Field of Search .................................. 74/30, 32, 50, 74/132; 123/197.3, 197.4

[56] References Cited

U.S. PATENT DOCUMENTS

| | | | |
|---|---|---|---|
| 455,009 | 6/1891 | Shoudy, Jr. ............................. | 74/132 |
| 610,236 | 9/1898 | Johnsen ................................. | 74/32 |
| 719,595 | 2/1903 | Huss ..................................... | 74/29 X |
| 1,305,933 | 6/1919 | Renne ................................... | 74/30 |
| 1,505,856 | 8/1924 | Briggs ................................... | 74/50 |
| 1,687,425 | 10/1928 | Briggs ................................... | 123/197.4 X |
| 4,803,890 | 2/1989 | Giuliani ................................. | 74/50 X |
| 4,803,964 | 2/1989 | Kurek et al. .......................... | 123/197.4 |

*Primary Examiner*—Allan D. Herrmann
*Attorney, Agent, or Firm*—Ilya Zborovsky

[57] ABSTRACT

A mechanism of converting a reciprocal movement into a rotary movement comprises a coulisse and a toothed unit cooperating with one another, the coulisse being shaped so that conversion of the reciprocal movement to rotary movement is performed in a sequence successively by the toothed unit and the coulisse. Also, an internal combustion engine with the new mechanism can be provided.

7 Claims, 5 Drawing Sheets

5,655,404

MECHANISM FOR CONVERTING RECIPROCAL MOVEMENT

BACKGROUND OF THE INVENTION

The present invention relates to a mechanism of converting reciprocal movement into a rotary movement as well as to internal combustion engines provided therewith.

Mechanism of converting linear reciprocal movement into a rotary movement are well known and used in internal combustion engines, steam engines, bicycles and the like, and are generally known as crank and connection-rod assembly. Such mechanisms are simple to manufacture. However, their efficiency is relatively low and reaches approximately 20–25%.

Another mechanism is disclosed for example in U.S. Pat. No. 4,485,768 and describes a mechanism for converting a reciprocal movement into a rotary movement which includes a coulisse or a slotted guide and a crank. Such construction is also simpler to manufacture when compared with the previously described mechanism, and has the efficiency of 10–20% higher.

SUMMARY OF THE INVENTION

Accordingly, it is an object of the present invention to provide a mechanism for converting a reciprocal movement into a rotary movement which has a higher efficiency.

In keeping with these objects and with others which will become apparent hereinafter, one feature of the present invention resides, briefly stated, in a mechanism of the above mentioned type which has a shaft throw, a first element having a slot surrounding the throw, a toothed unit, the slot being curved over its whole length and having two slot parts, and two toothed mechanisms each including a toothed wheel and a toothed rack, each having teeth only over a portion of its surface, the slot parts being located at both sides of an axis of symmetry and having different curvatures each corresponding to a diameter of a pitch circle of a respective one of the toothed wheels.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
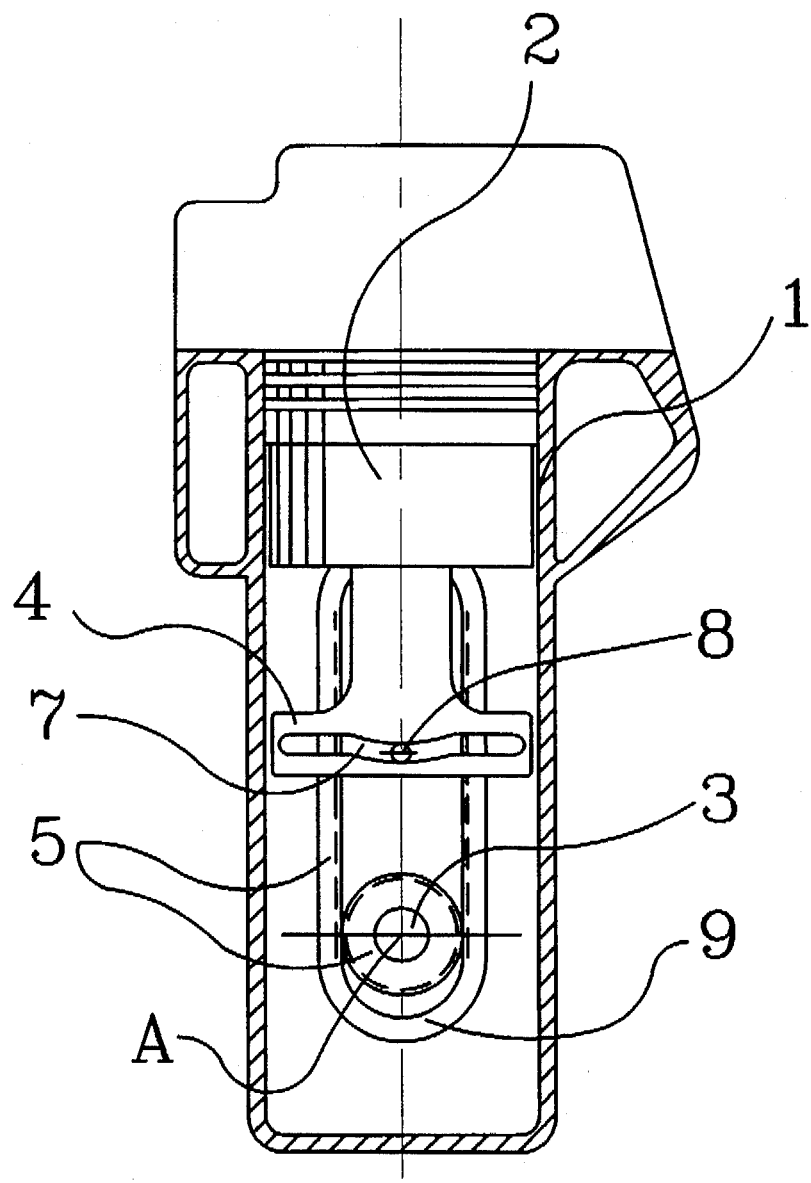
FIG. 1 is a view showing a section of a cylinder of an internal combustion engine with the mechanism of converting a reciprocal movement of a piston into a rotary movement of an output shaft in accordance with the present invention.
Figure 2:
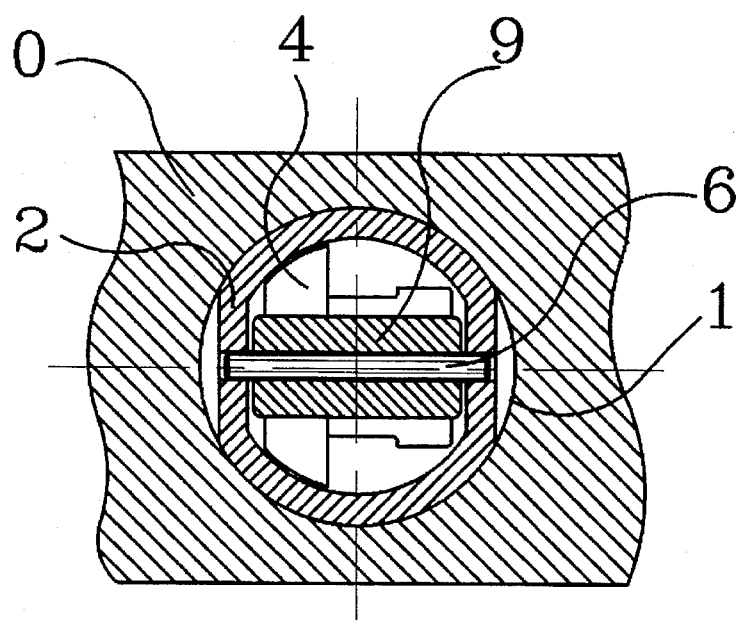
FIG. 2 is a view showing an axial section of a piston pin of the internal combustion engine of FIG. 1.
Figure 3:
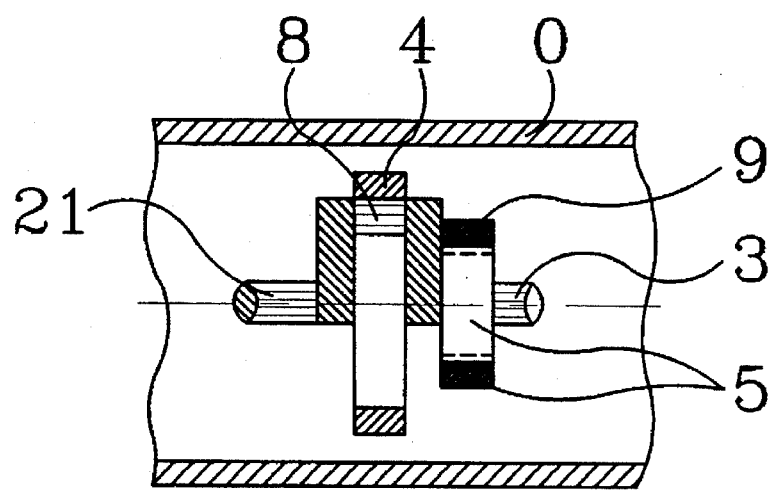
FIG. 3 is a view showing an axial section of the output shaft with a toothed unit of a classic type.

A mechanism of conversion of a reciprocal movement into a rotary movement is shown as utilized in an internal combustion engine having a casing O with a cylinder 1 illustrated in FIGS. 1 and 2, a piston 2, and output shaft 3 shown in FIGS. 1, 3, 4, 5 and 6 and connected with the piston 2 by the inventive mechanism. The mechanism includes a coulisse 4 (a sliding guide on a sliding block) and a tooth unit 5.

The assembly of the coulisse 4 and the toothed unit 5 is connected with the piston 2 by a piston pin 6 shown in FIG. 2. The coulisse 4 is provided with a shaped slot 7 having two slot parts 7a and 7b as shown in FIG. 1, and a crankpin of a crankshaft throw 8 of the output shaft 3 extends through the slot 7.

Figure 4:
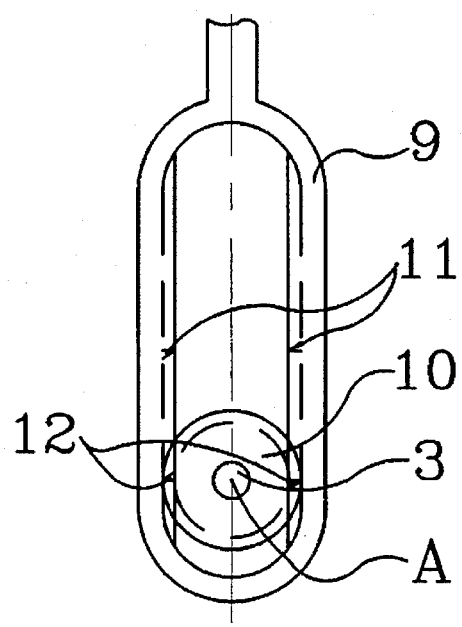
FIG. 4 is a view showing a toothed unit of a classic type.

The toothed unit of a classic type shown in FIG. 4 includes an enclosed elliptic rack 9 and a wheel 10. Teeth 11 and 12 are provided on the enclosed elliptic rack 9 and the ratchet wheel 10 and the teeth 11 extend in different directions at the sides of the rack 9. The teeth 11 and 12 have axes of turning and are spring biased which is not shown in the drawings.

Figure 5:
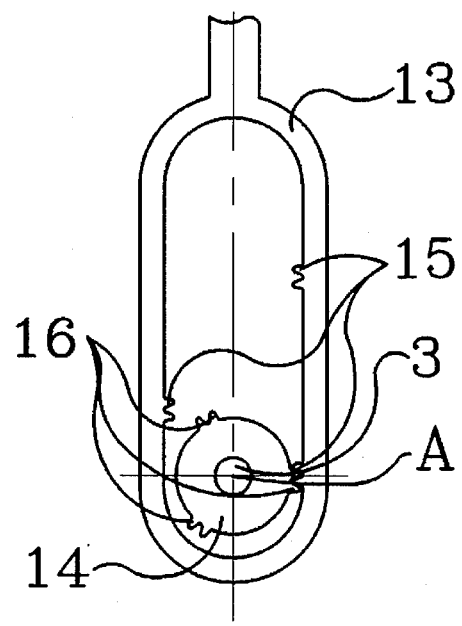
FIG. 5 is a view showing a tooth unit with one toothed wheel and teeth formed of one piece.

The toothed unit with one toothed wheel shown in FIG. 1 and teeth formed of one piece includes a two-side toothed rack 13 and a toothed wheel 14 provided with teeth 15 and 16 formed of one piece and arranged in a special order. As can be seen in FIG. 5 the teeth are formed as so-called Novikov teeth.

Figure 6:
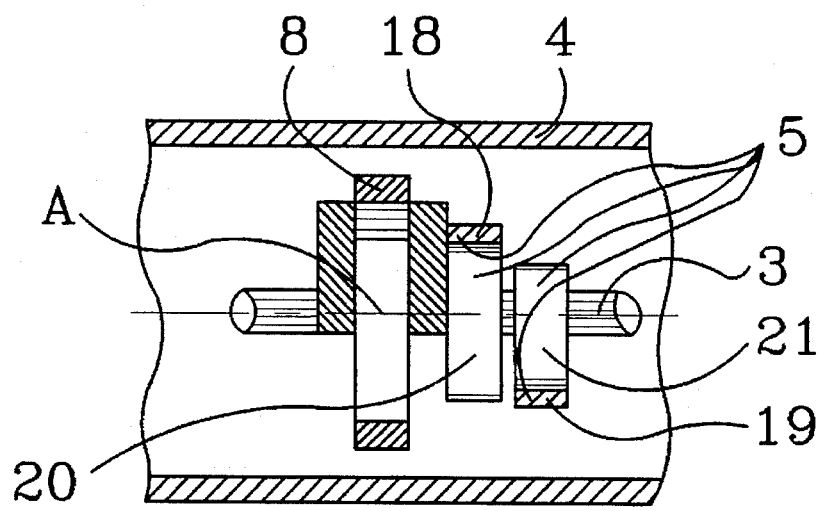
FIG. 6 is an axial view of the output shaft with the inventive mechanism of conversion with teeth located not opposite to one another and with two toothed wheels of different diameters.
Figure 7:
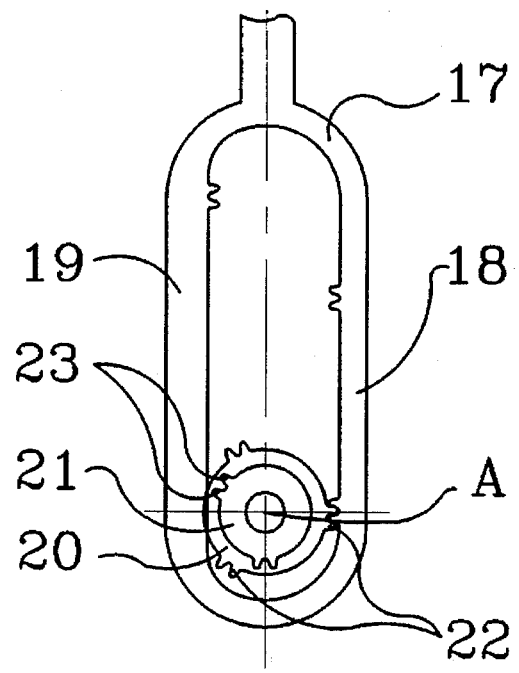
FIG. 7 is a view showing a tooth unit in accordance with the present invention with two toothed wheels of different diameters.

The toothed unit with two toothed wheels shown in FIGS. 6 and 7 includes two-side toothed rack 17 with the teeth at the sides 18 and 19 offset relative to one another or in other words not located exactly opposite to one another and also two toothed wheels 20 and 21. Teeth 22, 23, 24 and 25 are provided on each of the sides 18 and 19 of the two-side toothed rack 17 and on the toothed wheels 20 and 21. The teeth are arranged not over the whole surface, but instead in a special order. The teeth 22, 23, 24 and 25 can be also formed in accordance with the classic approach, or in other words spring biased which is not shown in the drawings.

Figure 8:
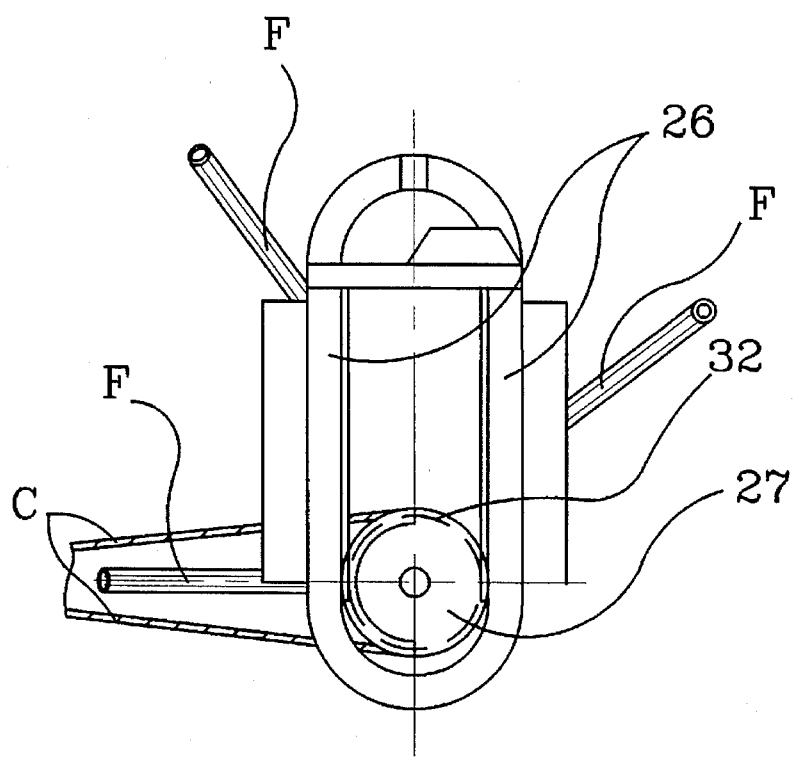
FIG. 8 is a view showing another construction of a conversion mechanism of the present invention.
Figure 9:
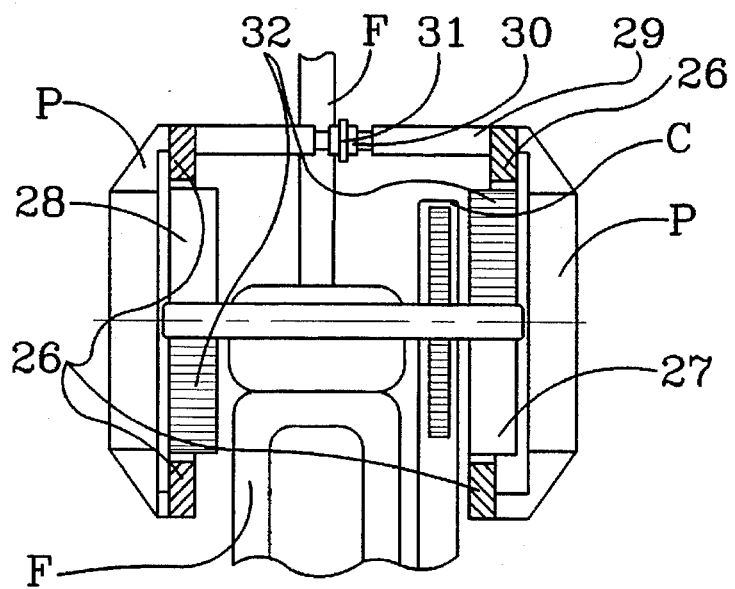
FIG. 9 is a view showing the inventive mechanism with two toothed wheels and a telescopic lever used for a bicycle.

The inventive mechanism for conversion of a reciprocal movement in FIGS. 8 and 9 into the rotary movement with muscle motion utilized for a bicycle having a frame F and a chain C and includes two elliptic two-side racks 26 with offset sides (teeth located not exactly opposite to one another), and cooperating toothed wheels 27 and 28 with a telescopical wheel 29 having an immovable support 30 and an axis 31. Movable supports of the elliptic rack are not shown in the drawings. The toothed wheels 27 and 28 are either of one piece or composed of two parts fixedly connected with one another, and the teeth 32 are located only on a half circumference. When the toothed wheels 27 and 28 are mounted they are offset by 180° with respect to the position of the teeth.

The operation of the inventive mechanism of conversion of reciprocal movement into rotary movement is as follows:

When air-fuel mixture is burnt into the cylinder 1, a high pressure is generated and acts on the piston 2 so that it moves from the upper dead point to the lower dead point. This reciprocal movement of the piston 2, via the piston pin 6, leads to the reciprocal movement of the system including the coulisse 4 and the toothed unit 5. The coulisse 4 and the toothed unit 5 transfer the force to the crankshaft pin of the crankshaft throw 8 and to the teeth 12, 16, 22 and 23. Since the crankshaft throw 8 and the teeth 12, 16, 22 and 23 have an offset relative to the rotary axis A, a torque is produced. The torque produced by the coulisse 4 depends on the force produced by the pin and on the length of the projection between the point of force application and the axis A. The torque generated by the toothed unit 5 depends only on the force generated by the piston, and therefore the torques generated by the coulisse and the toothed unit are different over the whole length of the piston stroke. In addition, with the equal given displacement of the piston, the coulisse and the toothed unit turn the output shaft by different angles.

Since the slot 7 is shaped or profiled, the angular displacement of the output shaft is equalized. The profiling is formed so that the displacement caused by the coulisse and the toothed unit, with the same displacements of the piston, are equal. The torque is produced on the output shaft by the toothed unit. For profiling of the path 17 of the coulisse, the value of the torque generated by the coulisse and the ratchet coupling at any moment of time is taken into consideration. When the torque generated by the coulisse becomes greater than the torque generated by the ratchet wheel, the direction of the profile of the coulisse slot changes, and the coulisse generates the torque on the output shaft.

This system of the coulisse wheel operates in accordance with the following principle: when the torque is generated by the coulisse, the wheel operates in the mode of sliding-over. During the opposite action the coulisse "neutralized" by the shaped slot. In the constructions disclosed in FIGS. 5, 6 and 7 the mode of sliding-over is replaced by the mode of idling due to the absence of teeth at corresponding locations on the toothed rack and on the toothed gears, or in other words the operation of the system can be programmed.

When the toothed unit as shown in FIGS. 6 and 7 is provided with two toothed wheels 20 and 21 and the two-side rack of said opposite sides, the possibilities of the conversion system are expanded. With the two toothed wheels and two-side rack with sides offset relative to one another, it is possible to provide an optimal mode of operation of the mechanism not only during the movement of the piston from the upper dead point to the lower dead point, but also during the movement from the lower dead point to the upper dead point.

In addition, the use of the toothed unit with two toothed wheels 20 and 21 provided for the possibility to have one toothed wheel with a greater diameter and another toothed wheel with a smaller diameter. This substantially increases the efficiency of the mechanism since the torque generated on the output shaft by the toothed unit depends directly proportionally on the diameter. In this case the shaped slot 7 has two functions: to equalize the offset and to accelerate the rotation of the output shaft.

When the piston moves from the upper dead point to the lower dead point, the output shaft must turn by 180°. When the toothed wheels of a diameter greater than a nominal diameter are used, the output shaft turns by a lower angle, and since the torque is generated alternatively by the coulisse and by the toothed unit, therefore when the torque is formed by the coulisse the angle of displacement of the output shaft is increased due to the profile of the slot 7. This provides for a required turning of the output shaft by 180° during the movement of the piston from the upper dead point to the lower dead point. The same regulation of the operation is performed during the movement from the lower dead point to the upper dead point.

Here, the nominal diameter is the diameter which provides a turning of the output shaft by 180° during the movement of the piston from the upper dead point to the lower dead point and it is determined by the formula $d_{opt}=2h/\Pi$, wherein h is a piston stroke from the upper dead point to the lower dead point.

Therefore, with the use of the inventive mechanism including the coulisse-toothed unit, it is necessary to increase the efficiency of for example an internal combustion engine by 50% and more.

When the mechanism is used in a bicycle, the force which causes the reciprocal movement is a constant value, and there is no necessity in the use of coulisse as a source of producing a torque, since the torque formed by the ratchet coupling is always greater than the torque formed by the coulisse.

In order to provide a required position and synchronized operation of two toothed unit it is sufficient to provide a telescopical lever 29. The mechanism of conversion of reciprocal movement into a rotary movement shown in FIGS. 8 and 9 with the telescopical lever 29 operates the same way as the mechanism including the ratchet coupling and the lever 29 and provides for a position of the pedals P in a fixed relation relative to one another. Such a construction generates a torque which is at least 50% higher than the known crank-connecting rod assembly. Moreover, the movement of the pedals is performed not along circumference, but instead exactly from above downwardly, that reduces consumption of muscle energy and is a positive advantage of this construction.

It will be understood that each of the elements described above, or two or more together, may also find a useful application in other types of constructions differing from the types described above.

While the invention has been illustrated and described as embodied in a mechanism for converting reciprocal movement into rotary movement, and an internal combustion engine provided therewith, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A mechanism for conversion of a reciprocal movement into a rotary movement, comprising a shaft throw; a first element having a slot surrounding said throw; a toothed unit, said slot being curved over its whole length and having two slot parts; and two toothed mechanisms each including a toothed wheel and a toothed rack, each having teeth only over a portion of its surface.

2. A mechanism as defined in claim 1, wherein each of said toothed rack is an enclosed elliptic two-side rack engaged with said toothed wheel.

3. A mechanism as defined in claim 2, wherein said teeth of said toothed rack and said toothed wheel are formed of one piece.

4. A mechanism as defined in claim 1, wherein said toothed racks are a two-side toothed rack with teeth offset relative to one another on opposite sides of said rack, and two toothed wheels each cooperating with a respective one of said side of said toothed rack.

5. A mechanism as defined in claim 4, wherein said toothed wheels have different diameters.

6. A mechanism as defined in claim 5, wherein said toothed rack is asymmetrical.

7. A mechanism as defined in claim 1, and further comprising damping means.

* * * * *